(12) United States Patent
Westberg

(10) Patent No.: US 8,425,959 B2
(45) Date of Patent: Apr. 23, 2013

(54) APPARATUS AND PROCESS FOR PRODUCING A DOUGH PRODUCT TOPPED WITH ASSORTED TOPPINGS AND A DOUGH PRODUCT

(76) Inventor: Till Westberg, Frankfurt am Main (DE)

( * ) Notice: Subject to any disclaimer, the term of this patent is extended or adjusted under 35 U.S.C. 154(b) by 1048 days.

(21) Appl. No.: 11/486,960

(22) Filed: Jul. 13, 2006

(65) Prior Publication Data

US 2007/0017383 A1    Jan. 25, 2007

(30) Foreign Application Priority Data

Jul. 20, 2005  (DE) .......................... 10 2005 034 510

(51) Int. Cl.
*A21D 13/007* (2006.01)
(52) U.S. Cl.
USPC .......................................... 426/231; 426/496
(58) Field of Classification Search .......... 426/302–303, 426/496, 439, 390, 391, 520, 231; 118/13–18; 99/450.1, 450.6, 494
See application file for complete search history.

(56) References Cited

U.S. PATENT DOCUMENTS

| 3,358,618 | A | * | 12/1967 | Vetta ............................. 99/450.1 |
| 3,390,645 | A | * | 7/1968 | Pacilio ............................. 99/353 |
| 3,602,154 | A |   | 8/1971 | Schimkat et al. |
| 3,760,715 | A |   | 9/1973 | Grote et al. |
| 3,851,554 | A |   | 12/1974 | Papai |
| 3,888,997 | A | * | 6/1975 | Guibert ............................. 426/27 |
| 4,060,027 | A |   | 11/1977 | Jenny |
| 4,112,834 | A |   | 9/1978 | Thiry et al. |
| 4,145,990 | A |   | 3/1979 | Hochandel et al. |
| 4,197,794 | A |   | 4/1980 | Raque et al. |
| 4,634,365 | A | * | 1/1987 | Triporo et al. ................. 425/398 |
| 4,685,387 | A |   | 8/1987 | Hanson et al. |
| 5,121,677 | A |   | 6/1992 | Le Claire et al. |
| 5,458,055 | A |   | 10/1995 | Fitch, Jr. |
| 5,921,170 | A |   | 7/1999 | Khatchadourian et al. |
| 5,997,924 | A | * | 12/1999 | Olander et al. ............... 426/296 |
| 6,245,370 | B1 |   | 6/2001 | Pilati et al. |
| 6,546,847 | B2 |   | 4/2003 | Pilati et al. |
| 6,755,122 | B2 |   | 6/2004 | Holmes |
| 2002/0020348 | A1 |   | 2/2002 | Gardner et al. |
| 2003/0183164 | A1 |   | 10/2003 | Pierre |
| 2005/0123659 | A1 |   | 6/2005 | Torghele et al. |

FOREIGN PATENT DOCUMENTS

| EP | 0 557 425 | 11/1991 |
| EP | 0 612 479 | 2/1994 |
| JP | 07-087878 A | 4/1995 |
| JP | 2004-024165 A | 1/2004 |

* cited by examiner

*Primary Examiner* — Steven Leff
(74) *Attorney, Agent, or Firm* — Renner, Otto, Boisselle & Sklar, LLP

(57) ABSTRACT

Apparatus and process for producing a flat dough product, in particular a pizza, topped with assorted toppings, is provided with a plurality of topping dispensers and at least one movable positioning mechanism, which is provided vertically below a plane spanned by the topping dispensers and to which a dough carrier is associated which may be supported such that it can rotate; the positioning mechanism actuated by an actuating mechanism to position the dough carrier underneath a topping dispenser to allow topping to be dispensed. The topping dispensers are arranged in a matrix configuration, distributed in two mutually perpendicular spatial directions x,y and the positioning mechanism is configured for positioning the dough carrier in the two mutually perpendicular spatial directions x,y corresponding to the matrix configuration. The topping dispensers are actuated passively to dispense topping by rotating the dough carrier and/or by means of the lifting mechanism.

17 Claims, 7 Drawing Sheets

Figure 1A:
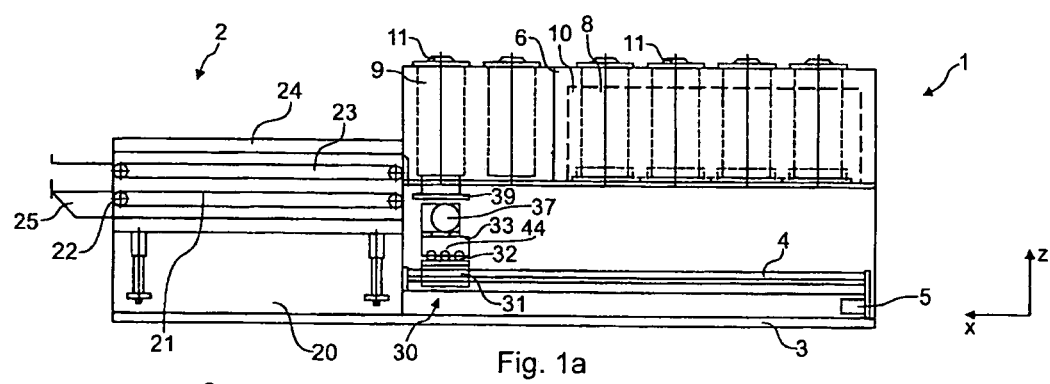

APPARATUS AND PROCESS FOR PRODUCING A DOUGH PRODUCT TOPPED WITH ASSORTED TOPPINGS AND A DOUGH PRODUCT

The present application claims priority under 35 U.S.C. §119 to German Patent Application No. 10 2005 034 510.7-23, filed 20 Jul. 2005, the text of which is filed herewith and incorporated herein by reference as if fully set forth in its entirety.

SCOPE OF THE INVENTION

The present invention relates in general to an apparatus and a process for producing a dough product topped with various toppings or ingredients, particularly a pizza, and relates in particular to such an apparatus and a corresponding process for producing pizzas and comparable dough products with suitability for use in catering concepts comparable to fast-food restaurants and also suitable for applications in themed restaurants.

BACKGROUND TO THE INVENTION

In small-scale catering, pizzas and comparable dough products are conventionally prepared and sold individually. The production of individually topped pizzas is comparatively labor intensive. In larger pizza restaurants, it is precisely this fact that has led to a strict division of labor, according to which one person kneads the dough and lays it on trays, another person adds the ingredients or toppings by hand and a further person bakes the pizza in an oven, in particular also in a wood-burning oven. Finally the pizza is served, although alternatively it can be placed in an insulated box for delivery. Only in smaller pizza restaurants is a single person responsible for the entire production of the pizza. It is a commonly observed feature of pizza restaurants that the person responsible for this prepares the pizza in the kitchen in view of the restaurant guests, with the aim of heightening the experience of the restaurant visit.

A mechanical or automated production of pizzas and comparable dough products is desirable on cost grounds. However, corresponding concepts exist only for large-scale catering and in particular also for the production of frozen pizzas. Conventionally a ready-rolled pizza dough, usually a frozen dough, is carried on a conveyor sequentially past topping dispensers, where toppings or ingredients are dispensed onto the dough according to the variety of pizza required. Corresponding concepts are disclosed in the following patents, for example: U.S. Pat. Nos. 6,546,847 B2, 6,245,370 B1, 4,197,794 and 4,060,027. Such concepts are not suitable for small-scale catering, however, as the purchase and running costs are too high and the necessary size of the apparatus is too large. A further disadvantage lies in the fact that individual production of pizzas, which is precisely what is required in small-scale catering, is not feasible with such concepts. If, for example, a customer wants a comparatively thick pizza dough baked until crisp, with a very individual selection of toppings and topping quantities, this can easily be done by hand. Automated concepts for such an individual production of pizzas are scarcely known from the prior art, however.

U.S. Pat. No. 5,921,170 A discloses an apparatus for producing pizzas which replicates the traditional production of a pizza by a person as closely as possible to allow the pizzas to be produced as individually as possible. The central element of such an apparatus is a centrally located, rotating positioning mechanism with a star-shaped arrangement of supporting arms carrying a number of rotating positioning plates, on which are held circular trays containing the pizza dough. Distributed around the centrally located positioning mechanism in what is described as a "revolver" arrangement there is a plurality of topping dispensers. By turning the rotating positioning mechanism, the trays positioned on the supporting arms with the pizza dough can be turned selectively to appropriate topping dispensers. An individually created pizza can thus be obtained by moving it past the various topping dispensers.

However, the revolver arrangement of topping dispensers used in this concept does not in principle allow a large number of different topping dispensers to be distributed around the center of rotation of the apparatus. This dramatically reduces the maximum number of different varieties of pizza that can be produced. Mixed toppings, for example diced ham and cheese cubes combined, must therefore be dispensed from a single topping dispenser, further restricting the diversity and flavors that can be obtained. The positioning of the pizza doughs underneath the topping dispensers is comparatively difficult and can only be achieved with an appropriate choice of angle of the supporting arms and radial position of the dough carriers. This requires special mechanisms and control systems, which further increases the costs of the apparatus. Nevertheless, a precisely indexed positioning of the dough carriers in the chosen revolver arrangement frequently cannot be reliably guaranteed. Furthermore, the distance between the dough carrier and the lower end of the topping dispenser is comparatively large, causing the apparatus to become soiled and hence leading to unnecessary cleaning costs.

SUMMARY OF THE INVENTION

It is an object of the present invention to provide an apparatus with which flat dough products can be topped individually at low cost, and with low purchase and maintenance costs for the apparatus. According to further aspects of the present invention, a corresponding production process and a topped dough product, in particular pizza, with an even more convenient arrangement of toppings are to be provided.

The present invention thus proceeds with an apparatus for producing a flat dough product topped with assorted toppings, in particular a pizza, comprising a plurality of topping dispensers and at least one moving positioning mechanism, which is provided vertically below a plane spanned by the topping dispensers and to which a dough carrier is associated, the positioning mechanism being actuated by an actuating mechanism in order to position the dough carrier underneath a topping dispenser to allow topping to be dispensed.

According to the present invention, the topping dispensers in an apparatus of the above type are arranged in a matrix configuration, distributed in two mutually perpendicular spatial directions, and the positioning mechanism enables selectively positioning the dough carrier in the two mutually perpendicular spatial directions in correspondence to the matrix configuration. The chosen matrix configuration allows the containers to be packed very tightly according to the invention, such that considerable installation space can be saved, yet at the same time a large number of different topping types can be obtained. Furthermore, the clearly articulated alignment of the containers in two mutually perpendicular spatial directions simplifies considerably the indexed positioning of the dough carrier holding the dough, since high-precision indexed x,y positioning mechanisms are obtainable at modest cost and an indexed adjustment can be executed quickly and precisely.

The containers are thus preferably arranged at the points of intersection of mutually perpendicular rows and columns of a matrix configuration. Naturally the rows and columns of the above matrix configuration can also be positioned at an angle other than at right angles to one another and the matrix configuration can also be formed in a different way from that described above. Simple and rapid positioning within the meaning of the invention can always be achieved without difficulty provided that the containers are positioned in a regular arrangement, in other words at regular, preferably equidistant, intervals from one another.

According to a further embodiment, the dough carriers are supported in such a way that they can rotate. This allows a yet more even distribution of the toppings and/or ingredients on the dough by rotating the dough as they are dispensed. Furthermore, by rotating the dough carrier and assembly against a complementary part, for example against a doctor blade, a piece of dough or topping positioned thereon can also be evened out easily into a round, circular dough or circular topping layer of a uniform thickness.

According to a further embodiment, guidance means such as for example guide rails, guide rods and the like, can be provided, which are aligned exactly parallel to the two mutually perpendicular spatial directions or are aligned corresponding to the aforementioned matrix configuration. Carriages or slides of the x,y positioning mechanism can thus be guided and supported substantially without play on these guidance means. In particular, the guidance means can allow the dough carriers to be positioned quickly underneath a predetermined container.

According to a further embodiment, the positioning mechanism may further comprise a lifting mechanism for raising and lowering the dough carrier, the dispensing of topping by a topping dispenser being triggered by positioning the dough carrier underneath the topping dispenser and raising the dough carrier until a predetermined distance or an infinitesimal distance between the dough carrier and a lower end of the topping dispenser is reached. In this way topping is only dispensed when a predetermined distance between the dough carrier and the lower end of the container or topping dispenser is reached.

Considerable advantages arise according to a further embodiment if the topping dispensers are actuated passively, because actuating mechanisms can thus be eliminated.

According to a further embodiment, the positioning mechanism and the topping dispensers are configured such that the dispensing of topping by the individual topping dispenser is only triggered when the dough carrier is positioned in a predetermined manner relative to the particular topping dispenser. An inadvertent dispensing of topping can thus be reliably avoided and the topping thus dispensed in a very controlled manner.

According to a further embodiment, the dough carrier and/or the positioning mechanism comprises an engaging means for engaging in a correspondingly formed release means provided on the lower end of each topping dispenser, the topping dispenser being designed in such a way that topping can only be dispensed if the engaging means and release means are mutually engaged or are interacting. A mechanical means of control for triggering the dispensing of topping is obtained in this way by simple means.

According to a further embodiment, the engaging means can be formed as an extension piece with a latching recess on the peripheral edge of the dough carrier and the release means as a snap-in lug on the lower end of the topping dispenser.

According to a further embodiment, the engaging means can also comprise a coupling element for coupling to a topping dispenser, the coupling element when engaged with the release means being located on a rotational axis of the dough carrier and the topping dispenser and being designed as a rotary actuator for a release mechanism on the topping dispenser.

According to a further embodiment, the release mechanism can be coupled to or can form a closing element on the lower end of the topping dispenser to close the topping dispenser.

According to a further embodiment, when the dough carrier is raised the engaging means engaged with the release means can move the closing element vertically to allow topping to be dispensed and/or conditioned.

According to a further embodiment, a disc provided with cut-outs and supported in such a way that it can rotate about a longitudinal axis of the container, along with a closing element, can be provided in the lower end region of at least one topping dispenser such that the topping dispensing rate can be controlled by the angle between the cut-outs and the corresponding slot, by the thickness of the disc and/or by the speed of rotation of the disc.

According to a further embodiment, the disc can have a plurality of cut-outs of varying size which in particular are disposed around the disc at uniform angular and/or radial intervals.

According to a further embodiment, the dough carrier can be designed to hold a freeform dough, in particular pizza dough.

According to a further embodiment, the dough carrier also has a conveying mechanism to transfer a topped dough to a downstream processing station.

According to a further embodiment, the conveying mechanism is in the form of a conveyor belt which crosses a support surface on the upper end of the dough carrier so that dough can be laid directly on the conveyor belt.

According to a further embodiment, the above conveying mechanism comprises at least one roller extending tangentially to the dough carrier, preferably also a second roller aligned perpendicular to the first, each roller being countersunk into a groove in the support surface of the dough carrier.

According to a further embodiment, the apparatus also comprises a housing with an associated refrigerating device, at least some of the topping dispensers and preferably the entire apparatus including all topping dispensers being located inside the housing.

According to a further embodiment, the refrigerating device is designed to cool the interior of the housing to a temperature in the range between 2° C. and 7° C.

According to a further embodiment, at least one of the topping dispensers can be cooled to temperatures below 0° C.

According to a further aspect of the present invention there is provided a process for producing a flat dough product topped with assorted toppings, in particular a pizza, by means of an apparatus comprising a plurality of topping dispensers arranged in a matrix configuration, distributed in two mutually perpendicular spatial directions, and a movable positioning mechanism which is provided vertically below a plane spanned by the topping dispensers and to which a dough carrier, preferably supported in such a way that it can rotate, is associated. In this process a piece of dough is placed on the dough carrier and the dough carrier is positioned sequentially underneath selected topping dispensers, the dispensing of topping by the individual topping dispenser being triggered only when the dough carrier is positioned relative to the topping dispenser in a predetermined manner.

According to a further embodiment, the dispensing of topping by a topping dispenser is triggered by positioning the dough carrier underneath the topping dispenser and by raising the dough carrier until a predetermined distance or an infinitesimal distance between the dough carrier and a lower end of the topping dispenser is reached.

According to a further embodiment, the topping dispenser is actuated passively by the positioning mechanism and/or the dough carrier to dispense topping.

According to a further embodiment, the dispensing of topping is triggered by the mutual engagement of the dough carrier and/or the positioning mechanism with a lower end of a topping dispenser.

According to a further embodiment, one of the topping dispensers is designed to dispense salami slices, a salami slice supply for dispensing salami slices being positioned eccentrically to the dough carrier and a plurality of salami slices being dispensed and distributed in at least one concentric circle on the dough by rotating the dough carrier about its rotational axis. Such a precise arrangement of toppings, such as salami slices for example, in one or more concentric circles, could hitherto not be achieved according to the prior art.

According to a further embodiment, the salami slices are distributed at predetermined constant angular intervals around the concentric circle.

According to a further embodiment, the salami slice supply is radially adjustable or comprises a plurality of salami slice dispensing mechanisms arranged in various radial positions such that the salami slices can be dispensed and distributed on the dough in at least two concentric circles of differing radii by rotating the dough carrier about its rotational axis.

According to a further embodiment, the salami slice supply comprises at least one salami sausage and the salami slices are separated from the salami sausage by a slicing mechanism, the slicing mechanism being actuated by rotational motion by rotating the dough carrier.

According to a further embodiment, two or more centrosymmetrical configurations of three salami slices, each having trigonal symmetry, aligned at constant angular intervals to one another, are distributed in two or more concentric circles on the dough.

According to a further embodiment, two or more centrosymmetrical configurations of four salami slices, each having tetragonal symmetry, aligned at constant angular intervals to one another, are distributed in two or more concentric circles on the dough.

According to a further embodiment, a total of nine salami slices are distributed on the dough, two centrosymmetrical configurations of three salami slices, each having trigonal symmetry, being distributed at an angular interval of 45° to one another in a first circle and a further offset centrosymmetrical configuration of three further salami slices having trigonal symmetry being distributed in a second concentric circle of a differing radius.

A further aspect of the present invention relates to a flat dough product, in particular pizza, on which are distributed assorted toppings, preferably produced by the process described above, on which are distributed a plurality of salami slices. According to the present invention two or more centrosymmetrical configurations of three salami slices, each having trigonal symmetry, aligned at constant angular intervals to one another, are distributed in two or more concentric circles on the dough product.

A further aspect of the present invention relates to a flat dough product, in particular pizza, on which are distributed assorted toppings, preferably produced by the process described above, on which are arranged a plurality of salami slices. According to the present invention two or more centrosymmetrical configurations of four salami slices, each having tetragonal symmetry, aligned at constant angular intervals to one another, are distributed in two or more concentric circles on the dough product.

A further aspect of the present invention relates to a flat dough product, in particular pizza, on which are distributed assorted toppings, preferably produced by the process described above, on which are arranged a plurality of salami slices. According to the present invention a total of nine salami slices are distributed on the dough product, two centrosymmetrical configurations of three salami slices, each having trigonal symmetry, being distributed at an angular interval of 45° to one another in a first circle and a further offset centrosymmetrical configuration of three further salami slices having trigonal symmetry being distributed in a second concentric circle of a differing radius.

BRIEF OVERVIEW ON THE DRAWINGS

Figure 1B:
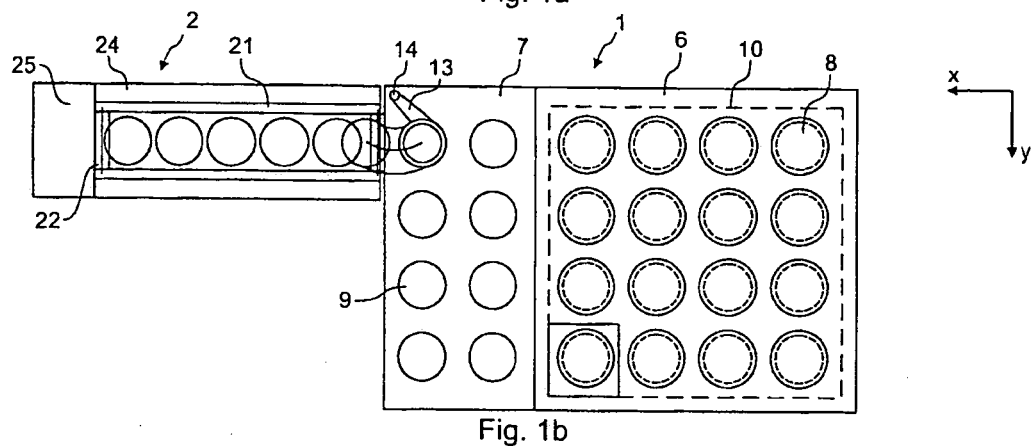
Figure 2A:
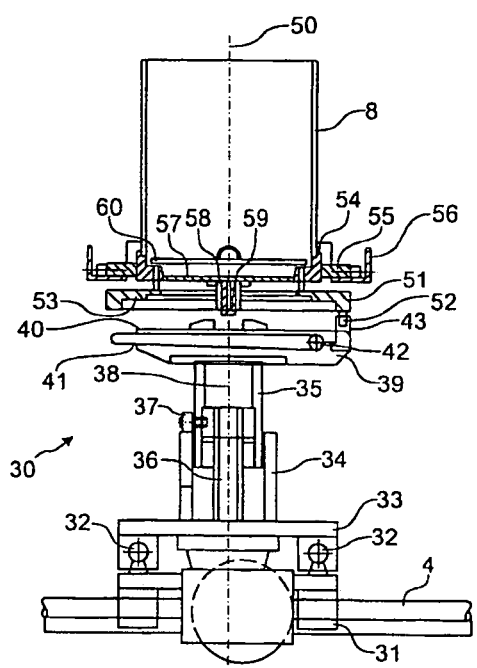
Figure 2B:
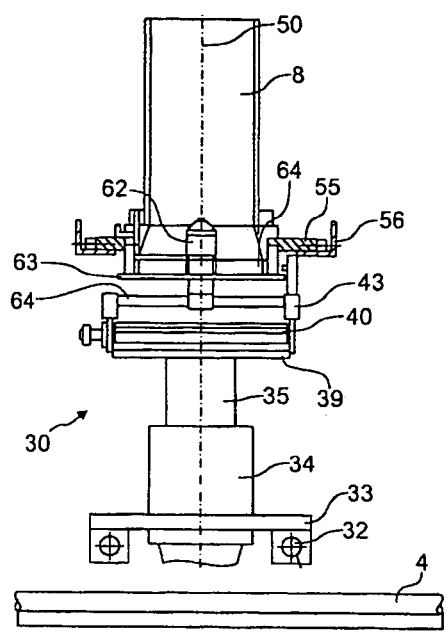
Figure 3:
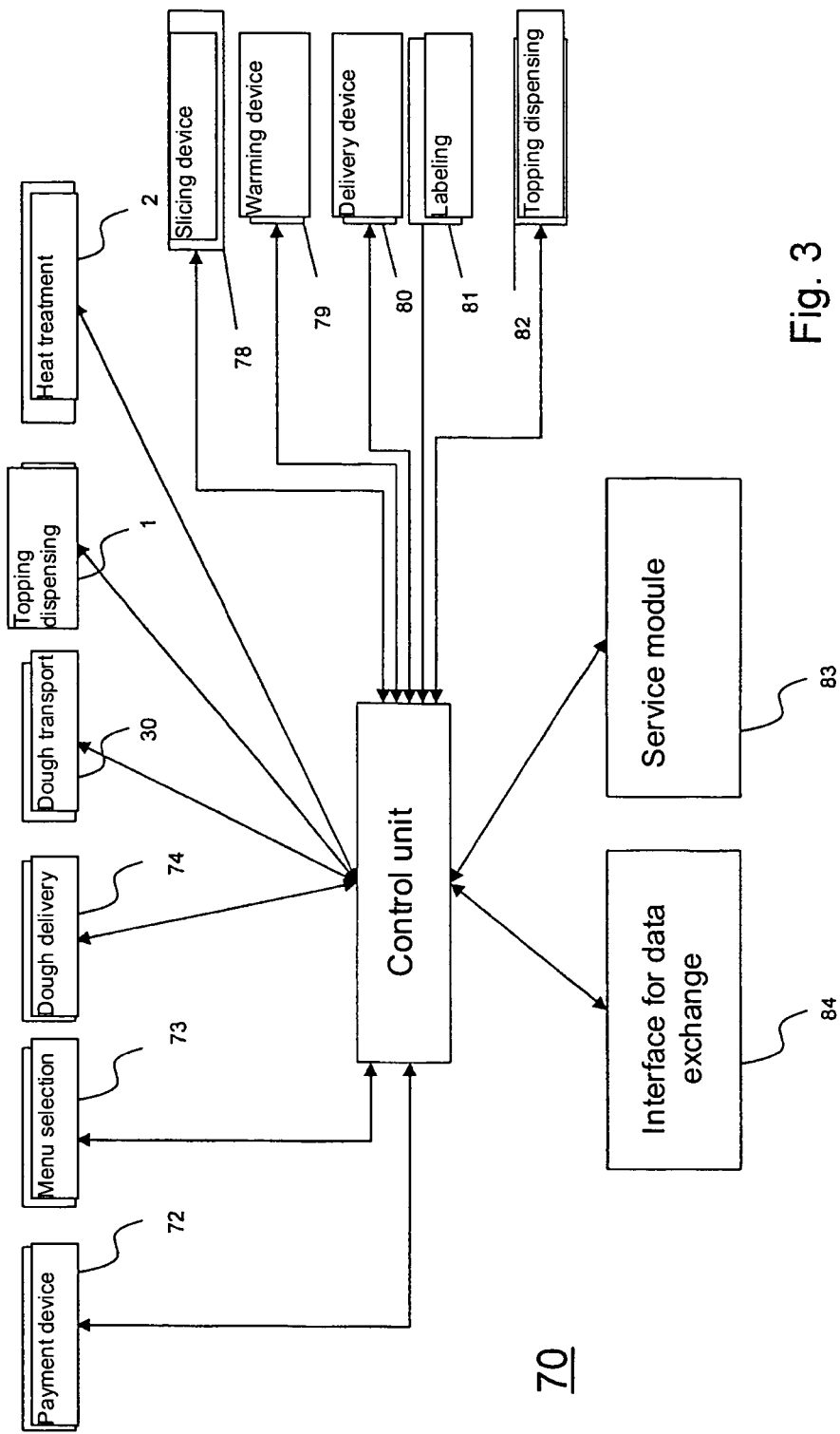
Figure 4:
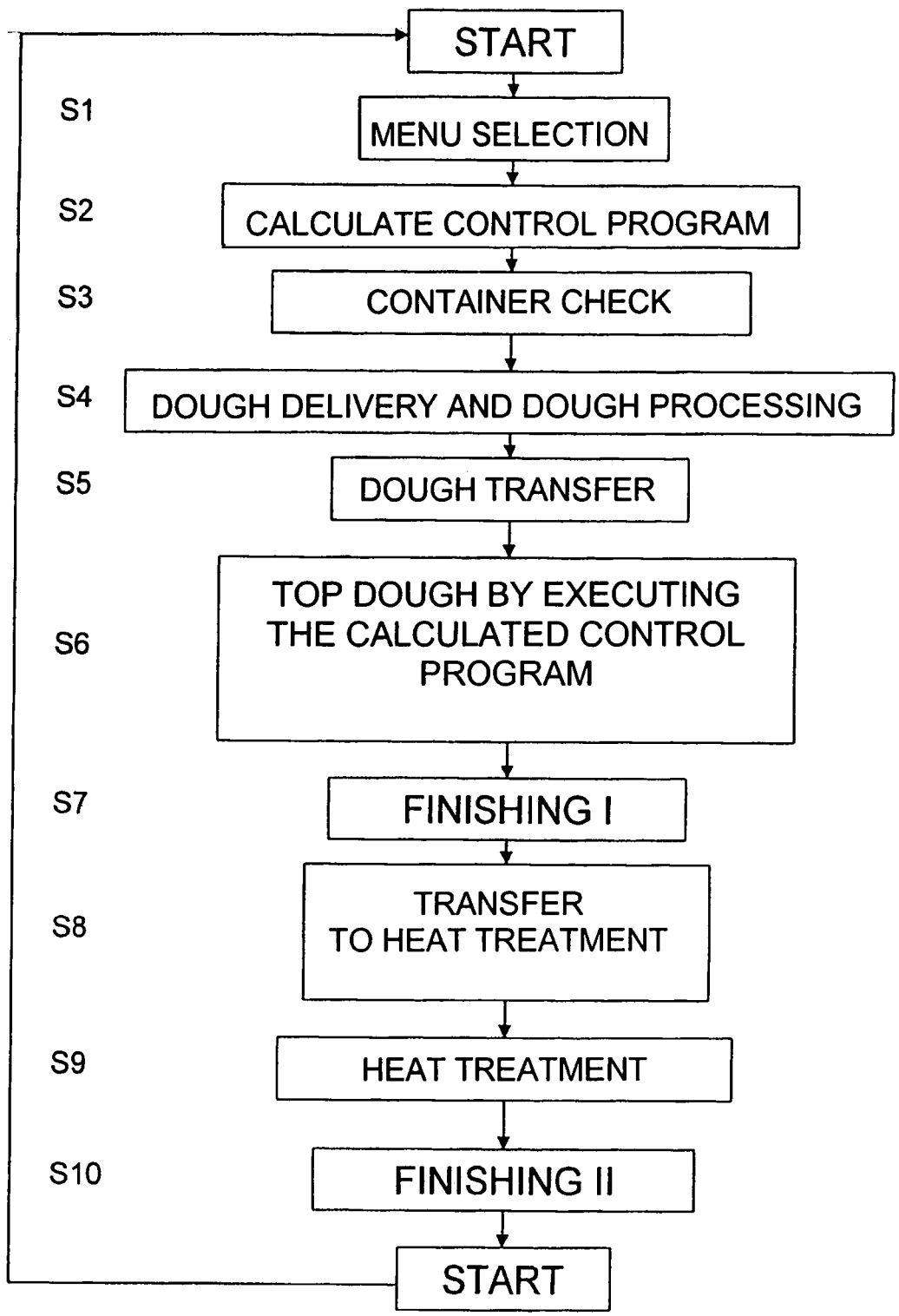
Figure 5A:
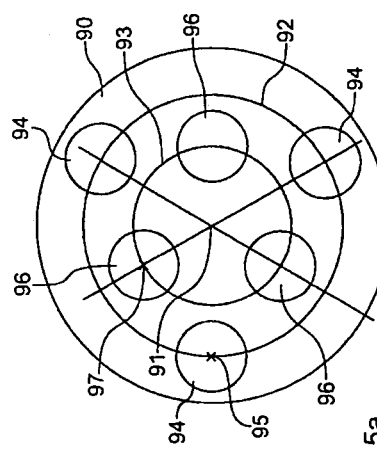
Figure 5B:
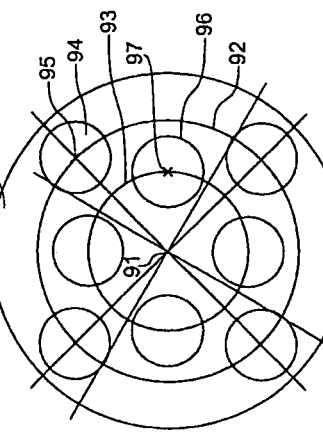
Figure 5C:
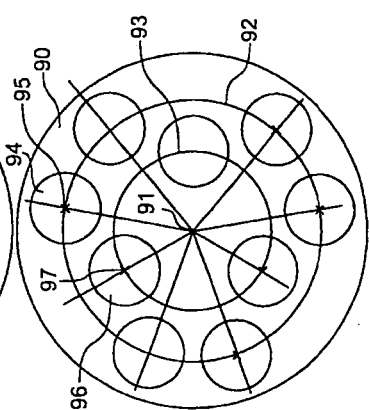
Figure 6A:
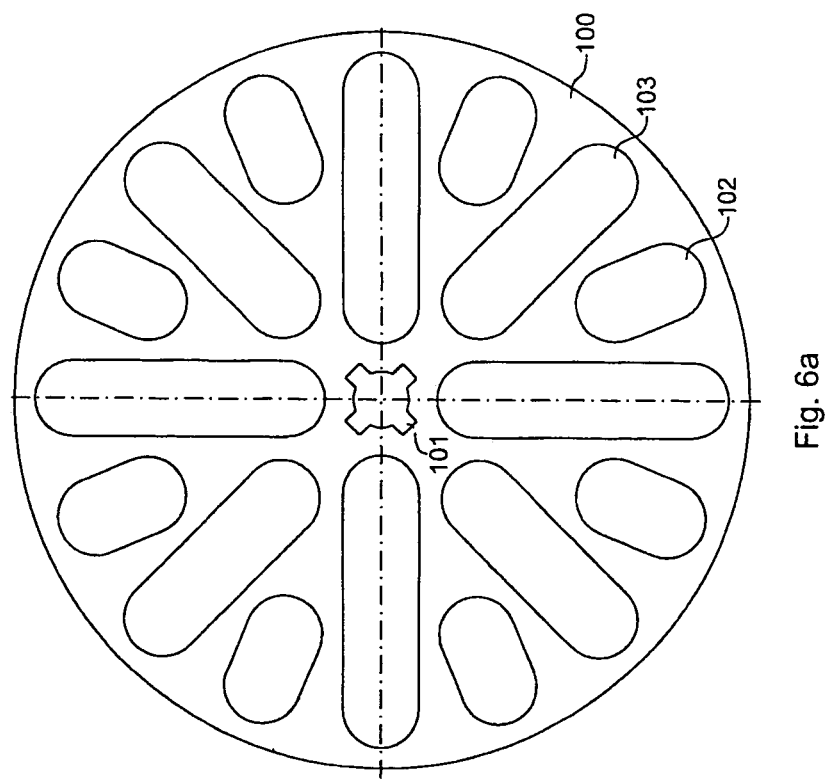
Figure 6B:
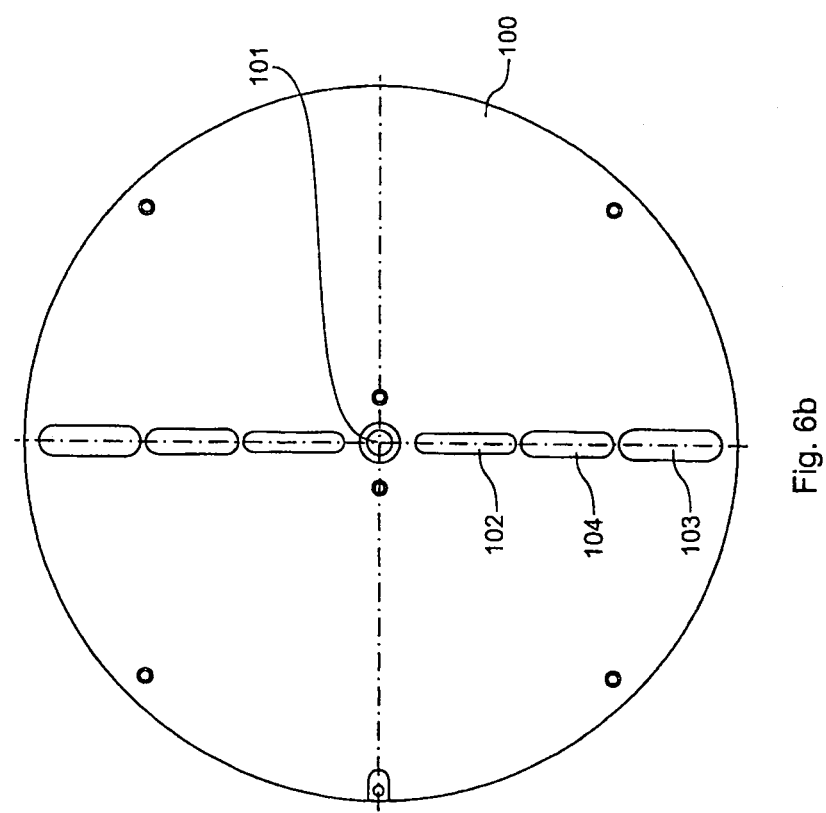

The invention is described below by way of example and with reference to the attached figures, which reveal additional features, advantages and objects to be solved and in which:

FIGS. 1a and 1b provide a schematic side view and top view of an apparatus according to the present invention;

FIGS. 2a and 2b provide a schematic sectional view and side view showing details of the positioning mechanism in the apparatus as shown in FIGS. 1a and 1b including a lifting mechanism for raising and lowering a dough carrier;

FIG. 3 provides a schematic block diagram of the substantial elements of the apparatus according to the present invention including a control unit;

FIG. 4 provides a schematic flow chart summarizing the steps involved in the process according to the invention;

FIGS. 5a-5c provide schematic top views of a pizza produced by the process according to the present invention with the configuration according to the present invention of salami slices; and FIGS. 6a and 6b provide schematic top views of a dispensing template provided at the lower end of a supply container.

Identical reference numbers in the figures indicate identical elements or groups of elements or substantially equivalent elements or groups of elements.

DETAILED DESCRIPTION OF A PREFERRED EXEMPLARY EMBODIMENT

As shown in FIG. 1a, the production apparatus identified as a whole by reference number 1 comprises a plurality of containers 8, 9 whose lower ends are substantially in alignment such that they span a plane. As can be seen from FIGS. 1a and 1b, the plurality of containers 8, 9 are distributed in a rectangular matrix configuration in two mutually perpendicular spatial directions x,y. The distances between the containers 8, 9 in the spatial directions x,y are constant, which simplifies considerably the positioning of the pizza dough. The containers 8, 9 are closed at the top with a lid 11, although this is not absolutely essential. At least some of the containers 8, 9 cool the ingredients held within them to suitable temperatures, as required by hygiene regulations for instance, for example to temperatures in the range between around 2° C. and 7° C., or alternatively to sub-zero temperatures in order to dispense frozen ingredients, for example cheese cubes. Alternatively, at least some of the containers can be housed in a refrigerated housing, for example in the housing 10 indicated by the dashed line in FIG. 1a. The entire pizza topping apparatus 1 is most particularly preferably housed in a refrigerated space, thereby avoiding the need to cool containers 8, 9 individually.

For applications in themed restaurants, the entire apparatus can also be housed in a refrigerated space in such a way that at least parts of the apparatus, in particular the pizza topping apparatus 1, are visible from the outside to visitors to a restaurant. Most particularly preferably also in such a way that the positioning mechanism 30 described hereafter is also visible from the outside to visitors to a restaurant.

As can be seen from FIGS. 1a and 1b, the containers 8, 9 are arranged in as tightly packed a matrix configuration as possible, in which they can almost touch one another. The containers 8, 9 hold assorted toppings or ingredients. More commonly used ingredients, such as tomato sauce and cheese cubes, can be held in preferentially arranged containers that are very easily accessed from the outside for refilling, for example in the containers 9 positioned at the left-hand end of the apparatus 1. Frequently used toppings can naturally also be held in a plurality of containers 8, 9. As will immediately be apparent to the person skilled in the art, the upper end of the containers 8, 9 can be connected to a supply mechanism to ensure that the containers 8, 9 are always adequately filled.

As shown in FIG. 1a the apparatus 1 is mounted on a frame 3 with a space below the plane on which the containers 8, 9 lie. On the base of the frame 3, as shown in FIG. 1a, an x-longitudinal guide 4, for example a guide rail, is provided, in which the carriage or slide 31 is carried in the x-direction. The x-longitudinal guide 4 is aligned parallel to the x-rows of the matrix configuration of containers 8, 9, which simplifies considerably the positioning of the dough carrier 39. On the carriage or slide 31 there are two guide rails 32 extending in the y-direction, along which the carriage 33 can be carried and moved in the y-direction. The guide rails 32 are aligned exactly in the y-direction and hence exactly parallel to the y-rows of the matrix configuration of containers 8, 9, which simplifies considerably the positioning of the dough carrier 39. An actuating mechanism 5 is associated to the x-carriage 31 and a y-actuating mechanism 44 to the y-carriage 33. The actuating mechanisms 5, 44 are operated by a control program executed in a central control unit 71 (see FIG. 3) which allows an indexed movement of the carriages 31, 33 to position the dough carrier 39 in the two mutually perpendicular spatial directions x,y in correspondence to the matrix configuration of containers 8, 9. Further details of the positioning mechanism 30 are described below in more detail with reference to FIGS. 2a and 2b.

To produce a pizza, a suitable pizza dough is first positioned on the dough carrier 39, as described in more detail below. This can occur at the right-hand end of the topping apparatus 1, for example, by means of a dough delivery station (not shown). The positioning mechanism 30 then moves the dough carrier 39 in an indexed sequence corresponding to the matrix configuration of the containers 8, 9 and according to a control program which calculates the traverse paths according to the toppings to be applied. The aim in principle is to minimize the overall distance to be traveled. The problem of the sequential actuation of the containers 8, 9 for the dispensing of toppings is comparable to the familiar "traveling salesman problem", so corresponding optimization algorithms can be used to calculate the traverse path. The traverse paths calculated in this way can also be stored in advance in a memory module in the central control unit, as described in more detail hereafter.

After the dough carrier 39 has been moved sequentially underneath the corresponding containers 8, 9 to dispense the toppings and all the desired toppings have been positioned appropriately on the pizza dough, the positioning mechanism finally moves to a front corner position, where a slider 13 which can swivel about a vertical swivel axis 14 finally slides the assembled pizza onto a conveyor belt 21 to the downstream pizza oven 2. The conveyor belt 21 moves at a suitable speed in the x-direction so that the pizza is baked appropriately in the oven interior 24 by means of the heating device 23. Finally the baked pizza reaches the front conveyor roller 22 of the conveyor belt 21, where a delivery mechanism and finishing station 25 is provided in the known manner as described in more detail hereafter.

The dimensions in millimeters in FIGS. 1a and 1b are given by way of example only. It can be concluded from these however that an apparatus for producing pizzas can be implemented with a very compact design according to the invention. As shown in FIG. 1b the 24 containers 8, 9 are arranged on a base measuring just 1700×2500 mm. The apparatus can thus easily be used even in small restaurants.

The positioning of the dough carrier and the dispensing of assorted toppings is described hereafter in more detail with reference to FIGS. 2a, 2b, 6a and 6b. As shown in FIG. 2a a lifting mechanism is located on the y-carriage 33 of the positioning mechanism 30 to raise and lower the plate-shaped dough carrier 39 in the z-direction. The lifting mechanism is a hydraulic lifting mechanism and comprises an upper lifting cylinder 35, which is supported in an oil bath in the lower lifting cylinder 34 in such a way that it can move longitudinally in the z-direction. The lifting rod 36 serves to move the upper lifting cylinder 35 vertically in the known manner. By virtue of the hydraulic mechanism the dough carrier 39 can be subjected to a very high load in the vertical direction, which is advantageous if so-called freeform pizza doughs are used, which are shaped from a piece of raw dough with vertical stamping and kneading on the dough carrier 39 to form a pizza dough. On the upper end of the dough carrier 39 there is a flat support surface 40, on which the pizza dough (not shown) is laid flat. The dough preferably lies directly on the support surface 40 or on a conveyor belt which crosses part or preferably also all of it. In FIG. 2a this conveyor belt, which later serves to remove the assembled pizza, is indicated only schematically by reference number 41. More specifically, the conveyor belt 41 runs in a continuous loop around a driving roller 42 and a plurality of driven rollers. Activating the driving roller 42 initiates the onward transport of the assembled pizza. As shown in FIG. 2a the conveyor belt 41 is countersunk in a longitudinal slot formed in the support surface 40 so that the upper side of the conveyor belt 41 is in contact with the lower side of the pizza dough. In order to remove the pizza dough, the rollers of the conveyor belt 41 can also be slightly adjustable in the z-direction. According to an alternative embodiment (not shown), there can also be at least one longitudinal slot provided in the support surface 40 of the dough carrier 39, in which a transport roller is countersunk tangentially to the round dough carrier 39 so that the peripheral surface of the transport roller just touches the underside of the pizza dough. Naturally two such transport rollers can also be positioned at right angles to each other, in other words one transport roller positioned tangentially and one transport roller radially, so that not only can the assembled pizza be removed radially but the unfinished pizza can also be rotated on the support surface 40 by the two rollers about the rotational axis 38.

In the embodiment according to FIG. 2a the dough carrier 39 is supported on the upper lifting cylinder 35 in such a way that it can rotate about the vertical rotational axis 38. Alternatively or additionally, the upper lifting cylinder 35 too can be supported in such a way that it can rotate. A rotary drive 37, which is operated by appropriate means by the central control unit (see FIG. 3), is associated to the dough carrier 39 in order to rotate the dough carrier 39 and the pizza dough resting on its support surface 40 about the vertical rotational axis 38 in a suitable manner.

In the exemplary embodiment according to FIG. 2*a*, the dispensing of topping from the container 8 is only triggered when the dough carrier 39 is raised until it reaches a predetermined maximum distance or an almost infinitesimal distance between the support surface 40 or the upper side of the pizza dough positioned thereon and a lower end of the container, in which is provided a topping dispenser as described in more detail hereafter. In other words, when the lifting mechanism is in its home position, with the dough carrier 39 moved vertically down, the dough carrier 39 is moved in an indexed sequence in the x,y direction corresponding to the matrix configuration of containers until the dough carrier 39 is positioned exactly underneath the container 8 requested by the control program being executed. The lifting mechanism then raises the dough carrier 39, with the pizza dough resting on its support surface 40, in an exactly vertical direction to trigger the dispensing of topping or ingredients.

In the exemplary embodiment according to FIG. 2*a*, the topping dispenser responsible for dispensing topping is actuated passively by moving the dough carrier 39 in the vertical direction (z) and/or by rotating the dough carrier 39 about the vertical rotational axis 38. On account of the vertical lifting of the dough carrier 39 there is only a small gap between the dough carrier 39 and the lower end of the container 8, which minimizes the risk of soiling of the apparatus. According to alternative embodiments (not shown), the position, in particular the height position, of the dough carrier 39 can be detected or sensed and the dispensing of topping actuated electronically by a controller associated to each container, although this is more complex. Any mechanical, electronic, optical, in particular optoelectronic, or magnetic sensing devices, such as are adequately known to the person skilled in the art from the prior art, are suitable in principle for detecting the position of the dough carrier 39.

The triggering of the dispensing of topping by appropriate height adjustment of the dough carrier is described in more detail hereafter with reference to FIGS. 2*a* and 2*b*. In the exemplary embodiment according to FIG. 2*a* a topping dispenser provided at the lower end of the container 8 is mechanically coupled to the dough carrier 39 and the positioning mechanism 30 when a suitable position of the dough carrier 39 in the x,y plane and in the vertical direction (z) is reached. For the mechanical coupling suitable mechanical coupling devices are provided on the dough carrier 39 and on the lower end of the container 8, which interact in an appropriate way to bring about the dispensing of topping. On studying the present application, numerous possible variants for such a mechanical coupling will immediately become apparent to the person skilled in the art. By way of example, FIG. 2*a* discloses a positive locking arrangement of elements according to which at least one vertical extension piece 43, within which a recess is formed, is provided on the peripheral edge of the plate-shaped dough carrier 39. By preference, a plurality of such extension pieces 43 is distributed around the perimeter of the dough carrier 39, conveniently at constant angular intervals. As shown in FIG. 2*a*, a container receiver 54 with at least one extension piece 55 projecting radially from it is provided on the lower end of the container 8. The container receiver 54 is connected to a flange 51, on the peripheral edge of which at least one snap-in lug 52 extends downwards with a spur corresponding to the recess in the extension piece 43. When the spur on the front end of the extension piece 51 engages positively in the recess in the extension piece 43 and the dough carrier 39 is raised further in a vertical direction, the topping dispenser on the lower end of the container 8 is finally coupled mechanically to the dough carrier 39 and the positioning mechanism 30.

More specifically, as shown in FIG. 2*a*, the flange 51 is coupled to the lower end of the container 8 in such a way that by raising the dough carrier 39 further, the nozzle 58 on the container base 57 is released to dispense tomato sauce or a comparable product in paste form onto the dough, either in the position shown in FIG. 2*a* or distributed over the entire dough by means of a plurality of dispensing openings. The aforementioned mechanical coupling can also be made with a metering base 60 provided in the container 8, which is coupled to a closure 59 at the dispensing end of the nozzle 58 in such a way that a predetermined quantity of tomato sauce or product is dispensed from the nozzle 58 or from the plurality of dispensing openings in the container base 57. This quantity can be influenced in particular also by the vertical position of the dough carrier 39.

In the exemplary embodiment according to FIG. 2*a* the dispensed topping can also be evened out further by rotating the dough carrier 39 about the vertical rotational axis 38. This rotational movement can take place during or after the dispensing of the topping. To this end in this exemplary embodiment an annular inner face is provided on the underside of the flange 51, which when the dough carrier 39 is in a suitable vertical position is virtually in contact with the dispensed topping. In the case of the dispensing of tomato sauce, for example, the clearance between the top of the pizza dough and the inner face 53 would be chosen to be comparatively small. In this suitably chosen vertical position the topping can be evened out circumferentially on the dough, preferably across the entire surface, by rotating the dough carrier 39 with the dough (not shown) supported thereon in such a way that it does not rotate.

To dispense granular, powdered or chopped toppings, very different dispensing conditions can be obtained with the apparatus according to the invention, since the height and angle of the dough carrier 39 can be varied significantly. To dispense the last-named toppings from a supply container, for example, it can be convenient for a closing element on the container base to be released or lifted, folded back, turned away or similar by the mechanical coupling of the dough carrier to the lower end of the supply container, for example in the aforementioned mechanical way, and for the topping to then be dispensed in a metered manner. To meter out the topping, a dispensing template, which is described in more detail hereafter with reference to FIGS. 6*a* and 6*b*, can be provided inside the container at the lower end.

As shown in FIG. 6*a*, the dispensing template 100, which is circular in shape corresponding to the inner cross-section of the associated container, contains a plurality of cut-outs 102, 103 of varying size. Topping stored in the container can fall vertically downwards through these cut-outs 102, 103. The dispensing template 100 is supported at the center of rotation 101 in such a way that it can rotate about the longitudinal axis 50 of the container (see FIG. 2*a*) and the vertical axis 38 of the dough carrier 39 (see FIG. 2*a*) which aligns thereto. The rotary actuator for the dispensing template can be provided by a specially provided rotary actuator on the container itself, although that would be costly. It is therefore preferable for the dispensing template to be actuated passively by rotating the dough carrier 39, to which end a mechanical coupling of the dough carrier and dispensing template, for example in the aforementioned manner, can be provided. As will be immediately apparent to the person skilled in the art, the topping dispensing rate can be influenced in an appropriate way using simple parameters, such as for example the configuration and angle of the cut-outs, the thickness of the disc 100 and/or by the speed of rotation of the disc 100, by means of the control program being executed in the central control unit, for example.

After a suitable dispensing of topping, the dispensing template 100 is moved out of engagement with the dough carrier by rapid lowering of the dough carrier, and at the same time the closing element provided on the container base is activated to close the container. FIG. 6*b* shows a further example of a dispensing template in which three pairs of cut-outs of varying size 102-104 are arranged in radial alignment. As shown in FIG. 6*b*, the further the cut-outs 102-104 radiate out from the center, the wider they open. In this way a very constant amount of topping, in particular sauce topping or topping in paste form, can be dispensed and distributed over the entire surface of the dough if the dispensing template 100 and the dough are rotated relative to one another to dispense the topping.

FIG. 2*b* shows a further example of a mechanical coupling of the dough carrier to a topping dispenser. Above the crossbar 64 used for mechanical coupling in the manner described above, a slicing blade 63 is provided with which a salami slice can be sliced from a salami sausage held in the container 8 by rotating the slicing blade 63. The rotational movement of the slicing blade 63 is actuated passively by rotating the dough carrier 39.

A unique particularly convenient arrangement of salami slices can be obtained according to the present invention on a pizza base through the feature according to the present invention whereby the dough carrier can be rotated independently about the vertical rotational axis. Not only can this arrangement give a particularly aesthetic impression to the customer, which can increase the sales value of the pizza, but it also serves technical purposes too. In particular, with a particularly balanced arrangement of salami slices a particularly uniform crust can be achieved on the pizza when it is baked in the pizza oven. The flavor too can be improved considerably with a particularly balanced arrangement of salami slices. Finally, an optimally distributed arrangement of salami slices on the pizza dough can also bring about a considerable cost saving.

FIGS. 5*a* to 5*c* summarize three arrangements of salami slices on a pizza dough which are preferred according to the invention. According to FIG. 5*a*, three salami slices are arranged on the circular pizza base 90 in an outer circle 92, which is concentric to the center of rotation 91 of the pizza base 90, at uniform angular intervals, and three further salami slices 96 are arranged in a further concentric circle 93 with a smaller radius, again at uniform angular intervals. The arrangement of the salami slices 94, 96 on the concentric circles 92, 93 can be realized by positioning the pizza base 90 centrally on the dough carrier and by rotating the dough carrier to dispense the salami slices from a container, it being important to ensure that the center of rotation 91 of the pizza base 90 is aligned with the longitudinal axis of the container. The arrangement of salami slices in various concentric circles can also be realized in particular by positioning several salami sausages in the salami container eccentrically to and at differing radii from the center of rotation 91, such that the slicing blade slices the salami slices uniformly as the dough carrier rotates. Naturally several salami dispensing stations can also be provided eccentrically to the center of rotation 91 and at differing radii.

As shown in FIG. 5*a*, the salami slices are distributed in two centrosymmetrical configurations, each having trigonal symmetry, in two different concentric circles, and at constant angular intervals. The configuration formed by the salami slices 94, corresponding to the trigonal symmetry, is offset by 45° relative to the configuration formed by the salami slices 96.

FIG. 5*b* shows a corresponding arrangement of a total of 8 salami slices 94, 96 on the dough base 90 and FIG. 5*c* shows a comparable arrangement of a total of 9 salami slices 94, 96 on the dough base 90.

The control and operation of the apparatus according to the present invention are described hereafter by way of example with reference to FIGS. 3 and 4. As shown in FIG. 3, the apparatus comprises a process controller 70 with a central control unit 71, for example a CPU, which controls all stations in the apparatus centrally. The process controller is described hereafter by means of an example which is suitable for franchising concepts for fast-food pizza restaurants. The process controller accordingly comprises a central menu selector 73 in which the different varieties of pizzas and/or toppings are clearly displayed. This can be achieved with a screen display for example, in particular a touch-sensitive screen. The menu selector 73 can either be operated by a member of staff, as is conventional in fast-food restaurants, or in other embodiments by the end consumer himself or herself. On the menu selector 73 a number of selection fields are displayed which have to be actuated, for example by touch, in order to select them. The menu selection commands are then transmitted to the central control unit 71, where a corresponding control program is already stored in a memory or one is calculated.

The control unit 71 then triggers the dough delivery station 74 to deliver a pizza dough of a suitable consistency and thickness. The pizza dough can be shaped in a suitable way from a piece of dough by kneading, etc. (known as freeform pizza dough). Or the pizza dough can be delivered as frozen pizza dough. The delivered pizza dough can also be pre-baked in an oven before the toppings are applied. The pizza dough is placed directly on the rotating dough carrier of the positioning mechanism. The control unit 71 then controls the positioning mechanism 30 in an appropriate way in order to position the dough underneath selected containers and to trigger the dispensing of toppings in the manner described above, in particular by means of a mechanical coupling of the dough carrier to a topping dispenser at the lower end of each container.

Once the appropriate topping dispensing stations have been visited, the assembled pizza is transferred to an oven 2, where by means of appropriate additional processing the pizza is baked until ready. The baked pizza is then transferred to appropriate finishing stations, in particular a slicing mechanism 78 to slice it into portions, a heat-retaining device 79 to keep the baked pizza warm until it is packed or eaten and/or a delivery device 80. The latter can be designed to place the pizza in an insulated box, a paper bag, etc. The control unit 71 can then actuate a labeling unit 81 to apply a suitable label, for example an alphanumeric code or a barcode. The central control unit 71 can also actuate a voucher output system 82 to produce a voucher appropriate to the particular restaurant concept, for example a paper sales slip, an RF tag, etc.

For self-service applications a payment device 72 can also be provided, which accepts coins, notes or non-paper money, such as debit cards or credit cards for example, for payment and only initiates a process to produce a pizza once the necessary payment has been made.

As shown in FIG. 3, the central control unit 71 can further be coupled to a service module 83, which continuously monitors the operating status of the installation and initiates maintenance measures, in particular self-cleaning programs, or alerts service personnel if necessary. An interface 84 for data exchange, via the internet or a network connection for example, can also be provided, via which important operating data can be exchanged with the process controller 70 and continuously monitored. Such an interface can in particular be used for efficient product management, such that ingredients and toppings and other consumables, in particular packaging, preprinted sales slips, slicing blades and the like, can be ordered automatically and in good time.

FIG. 4 provides a clear summary of the substantial process steps for producing a pizza. The process begins with a menu selection (step S1) such that the end consumer himself or herself or member of staff in the manner of fast-food restaurants individually selects a pizza to be produced, in particular by choosing ingredients and toppings, thickness of dough, amount of ingredients or toppings, baking parameters, etc. Then in step S2 a control program is calculated to control the positioning mechanism, the lifting mechanism, the rotary drive for the dough carrier and the voucher output devices. A continuous monitoring system for the fill level of the containers (step S3) determines whether the requested pizza can also actually be produced. If this is not the case, the program is stopped or, initiated by the central control unit, the corresponding container is refilled from a supply station or by changing the container. The control program then initiates the process for producing the pizza, as a consequence of which the pizza dough is delivered and processed in the manner described above (step S4), then transferred to the pizza topping apparatus (step S5), then topped with the ingredients and toppings selected in the menu selection (step S1), under the control of the control program being executed in the central control unit (step S6), then optionally finished (step S7), for example by evening out the toppings or ingredients by rotating, spreading, etc., the assembled pizza is then transferred to a heat treatment station, in particular an oven (step S8), the heat treatment completed (step S9) and then in the manner described above the pizza is finished and processed in an appropriate manner (step S10). The control program then returns to its initial state.

As will immediately become apparent to the person skilled in the art on studying the present description, a new pizza dough can be produced in the dough delivery station whilst a previous pizza dough is being topped in the pizza topping apparatus, baked in the heat treatment station or finished in the finishing station. This further reduces the cycle time for the apparatus according to the invention. Naturally any choice of ingredients or toppings can be applied to the dough, the following being listed by way of example: sauces and other products in paste form, vegetables, meat, such as for example salami slices, ham slices, and fish. The ingredients and toppings can be stored at room temperature or at lower temperatures, in particular also at sub-zero temperatures. The ingredients and toppings can be applied to the dough in any form and quantity and arrangement, in particular also as diced, granular, powdered or chopped material. The apparatus according to the present invention is naturally suitable for any dough geometry, which does not have to be circular but can also be differently shaped, in particular square, triangular or polygonal.

As used herein, the term "salami" is intended to include salami, for example, Italian salami, pepperoni and other sausage-like food preparations which may be sliced and used in preparation of products such as pizza.

What is claimed as new and is desired to be secured by Letter Patent of the United States is:

1. A process for producing a pizza topped with a custom-ordered individually selected combination of assorted toppings by means of an apparatus comprising:

a plurality of topping dispensers for dispensing topping, which are arranged in a matrix configuration, distributed in two mutually perpendicular spatial directions;

a dough carrier for carrying pizza dough;

a movable positioning mechanism which is provided vertically below a plane spanned by said plurality of topping dispensers for positioning said dough carrier underneath selected ones of said plurality of topping dispensers, said positioning mechanism comprising a lifting mechanism for raising and lowering said dough carrier along a central vertical axis and for supporting said dough carrier, a rotary drive being associated with said dough carrier to rotate said dough carrier and the pizza dough resting thereon about said central vertical axis; and a process controller for centrally controlling all stations in said apparatus, said process controller having a central menu selector for displaying different varieties of pizzas and/or toppings which may be individually selected by a user operating said central menu selector;

said process comprising the steps of:

placing a piece of pizza dough on the dough carrier; and in response to individually selecting a pizza with said individually selected combination of assorted toppings thereon by operating said central menu selector;

calculating a sequence of positioning steps for said positioning mechanism in which said positioning mechanism sequentially positions said dough carrier underneath said selected ones of said plurality of topping dispensers in accordance with said individually selected combination of assorted toppings and in correspondence to said matrix configuration of said topping dispensers such that the overall distance travelled by said dough carrier for dispensing said individually selected combination of assorted toppings is minimized; and sequentially positioning the dough carrier underneath selected ones of said plurality of topping dispensers by causing said positioning mechanism to selectively move said dough carrier and said pizza dough positioned thereon in the two mutually perpendicular spatial directions in an indexed sequence and in correspondence to said calculated sequence of positioning steps and said matrix configuration of said topping dispensers;

in which process said step of sequentially positioning the dough carrier comprises a first step for causing said positioning mechanism to move said dough carrier and said pizza dough positioned thereon underneath a first topping dispenser of said selected ones of said plurality of topping dispensers while said lifting mechanism is in a home position, actuating said lifting mechanism to raise the dough carrier and said pizza dough positioned thereon along said vertical axis for dispensing a first topping in a raised position of said lifting mechanism and causing said lifting mechanism to lower the dough carrier and said pizza dough positioned thereon along said vertical axis to said home position, a second step for causing said positioning mechanism to move said dough carrier and said pizza dough positioned thereon underneath a second topping dispenser of said selected ones of said plurality of topping dispensers different to said first topping dispenser while said lifting mechanism is in a home position, actuating said lifting mechanism to raise the dough carrier and said pizza dough positioned thereon along said vertical axis for dispensing a second topping different to said first topping in a raised position of said lifting mechanism and causing said lifting mechanism to lower the dough carrier and said pizza dough positioned thereon along said vertical axis to said home position and repeating said second step until all toppings of said individually selected combination of assorted toppings are dispensed;

the dispensing of topping by the selected topping dispenser is triggered only when the dough carrier is positioned underneath the selected topping dispenser and by vertically raising the dough carrier until a predetermined distance or an infinitesimal distance between the dough carrier and a lower end of the selected topping dispenser is reached; and said dough carrier and said pizza dough positioned thereon are rotated about said central vertical axis during or after said step of dispensing of topping by the selected topping dispenser such that said topping is evened out on said piece of pizza dough to a topping layer having a uniform thickness.

2. The process according to claim 1, wherein the said dough carrier is rotated about said central vertical axis at a small distance to an annular inner face disposed on an underside of a respective topping dispenser such that said topping is in contact with said annular inner face while said dough carrier is rotated about said central vertical axis for evening out said topping circumferentially.

3. The process according to claim 2, wherein the selected topping dispenser is actuated passively by at least one of the positioning mechanism and the dough carrier for dispensing topping.

4. The process according to claim 3, wherein the dispensing of topping is triggered by the mutual engagement of at least one of the dough carrier and the positioning mechanism with a lower end of the selected topping dispenser.

5. The process as claimed in claim 1, wherein the topping is dispensed in a metered manner by disposing a disc provided with cut-outs underneath at least one of said topping dispensers and between a lower end region of said at least one of said topping dispensers and said dough, rotating said disc about a longitudinal axis of said associated topping dispenser and controlling a topping dispensing rate by means of at least one of configuration and angle of said cut-outs, thickness of said disc and a speed of rotation of said disc.

6. The process as claimed in claim 5, wherein the selected topping dispenser is actuated passively by at least one of the positioning mechanism and the dough carrier for dispensing topping.

7. The process as claimed in claim 6, wherein the dispensing of topping is triggered by the mutual engagement of at least one of the dough carrier and the positioning mechanism with a lower end of the selected topping dispenser.

8. The process according to claim 1, wherein at least one of the plurality of topping dispensers is configured for dispensing salami slices, a salami slice supply for dispensing salami slices being positioned eccentrically to said dough carrier and a plurality of salami slices being dispensed and distributed in at least one concentric circle on the pizza dough by rotating the dough carrier about its rotational axis.

9. The process according to claim 8, wherein the salami slices are distributed at predetermined constant angular intervals around the concentric circle.

10. The process according to claim 8, wherein the salami slice supply is radially adjustable or comprises a plurality of salami slice dispensing mechanisms disposed in various different radial positions such that the salami slices can be dispensed and distributed on the pizza dough in at least two concentric circles of differing radii by rotating the dough carrier about its rotational axis.

11. The process according to claim 10, wherein two or more centrosymmetrical configurations of three salami slices, each having trigonal symmetry, aligned at constant angular intervals to one another, are distributed in two or more concentric circles on the pizza dough.

12. The process according to claim 10, wherein two or more centrosymmetrical configurations of four salami slices, each having tetragonal symmetry, aligned at constant angular intervals to one another, are distributed in two or more concentric circles on the pizza dough.

13. The process according to claim 10, wherein a total of nine salami slices are distributed on the pizza dough, two centrosymmetrical configurations of three salami slices, each having trigonal symmetry, being distributed at an angular interval of 45° to one another in a first circle and a further offset centrosymmetrical configuration of three further salami slices having trigonal symmetry being distributed in a second concentric circle of a differing radius.

14. The process according to claim 1, wherein said lifting mechanism comprises an upper lifting cylinder supporting said dough carrier, wherein said step of placing a piece of pizza dough on said dough carrier comprises placing a piece of raw pizza dough on said dough carrier and actuating said lifting mechanism to repeatedly move said dough carrier along said central vertical axis upwards and downwards to thereby vertically stamp and knead said piece of raw pizza dough until forming a free-form pizza dough on which said assorted toppings are dispensed subsequently.

15. The process according to claim 14, wherein the dough carrier is further rotated about said vertical axis against a complimentary part for evening out said piece of dough placed on the dough carrier into said piece of pizza dough, such that said free-form pizza dough is a round, circular piece of pizza dough.

16. The process according to claim 1, wherein the dough carrier is rotated about said vertical axis against a complimentary part for evening out a piece of dough placed on the dough carrier into said piece of pizza dough, such that said piece of pizza dough is a round, circular piece of pizza dough.

17. The process according to claim 1, wherein said dough carrier and said pizza dough positioned thereon are rotated about said central vertical axis against a complimentary part disposed on an underside of a respective topping dispenser such that said topping is evened out on said piece of pizza dough to a topping layer having a uniform thickness.

* * * * *